April 28, 1936. W. ALEXANDER Re. 19,942

SILENCER

Original Filed July 26, 1932

Inventor
William Alexander
By Pennie Davis Marvin & Edmonds
Attorneys

Reissued Apr. 28, 1936 Re. 19,942

UNITED STATES PATENT OFFICE 19,942

SILENCER

William Alexander, Glasgow, Scotland

Original No. 2,012,331, dated August 27, 1935, Serial No. 624,751, July 26, 1932. Application for reissue November 14, 1935, Serial No. 49,775. In Great Britain July 7, 1932

2 Claims. (Cl. 137—160)

This invention relates to silencers for muffling exhaust or intake noises of power engines, compressors, blowers, or the noise of discharge of fire-arms.

A silencer according to the invention is devised to impart a whirling movement to gas, air, vapour or steam being discharged from or admitted to an engine or the like or expelled from a gun-barrel or the like under conditions such that this whirling movement persists as a vortex within a series of vortex chambers each having a substantially central discharge aperture of substantially circular form at the end of such chamber remote from the gas entrance, the axis of each of said vortices containing the centre of each aperture.

For convenience the medium non-uniform discharge or intake of which is responsible for the noise is hereinafter referred to as "gas".

The inlet of the silencer is fitted with fixed guide vanes designed to impart an initial whirling motion to the gas, the rotational motion of which persists as a vortex after the gas has left the vanes.

Several forms of silencer according to the invention are illustrated by way of example in the accompanying drawing in which:—

Figure 1:
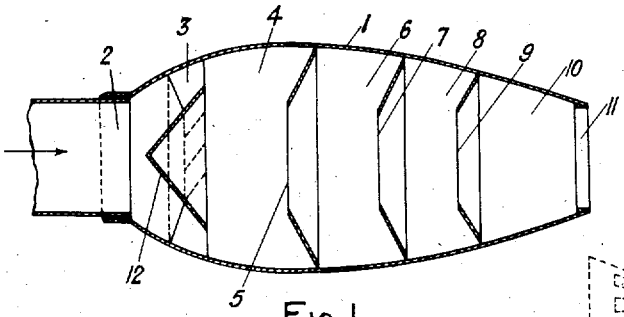
Fig. 1 is an axial section of a silencer having a stream-line body suitable for silencing the exhaust of an aero-engine.

In all the figures 1 denotes the shell or body of the silencer, the longitudinal section of which may be of any suitable shape and the transverse sections of which are of substantially circular shape, that is the shell constitutes a body of revolution. As shown, the shell 1 is divided by transverse partitions so as to constitute a series of vortex chambers. The gas enters by the inlet passage 2 and is given a whirling motion by the fixed inclined guide vanes 3. The vortex chamber 4 having a central or nearly central circular discharge aperture 5 at the end remote from that at which the whirling gas enters this chamber, the gas in said chamber has a convergent vortical motion which has its maximum velocity of whirl at the point of discharge into the next vortex chamber 6 in which and in the discharge aperture 7 similar vortical action occurs, to be repeated in vortex chambers 8 and 10 and discharge apertures 9 and 11.

In Fig. 1 the shell or body 1 has a stream-line form, so that when the silencer is fitted on an aeroplane, there will be a minimum of resistance to the motion of the silencer through the atmosphere.

Figure 1A:
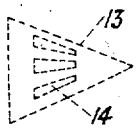
Fig. 1*a* is a fragmentary view showing a variant.

Instead of terminating with a circular discharge aperture 11 the body 1 may be continued to a point as shown in Fig. 1*a*. In this form the tail portion 13 is provided with slots or apertures 14 for the ejection of the gas.

Figure 2:
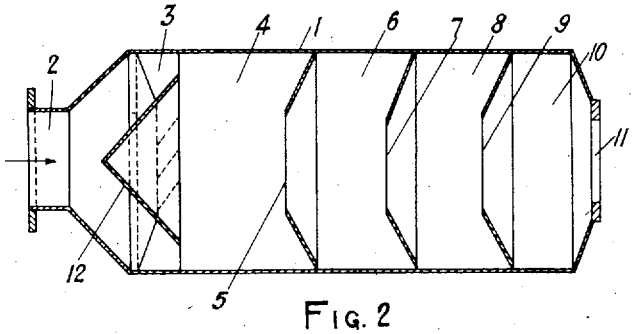
Fig. 2 is an axial section of a silencer with parallel-sided body suitable for the exhaust or gas discharge of an internal combustion engine or air compressor.
Figure 3:
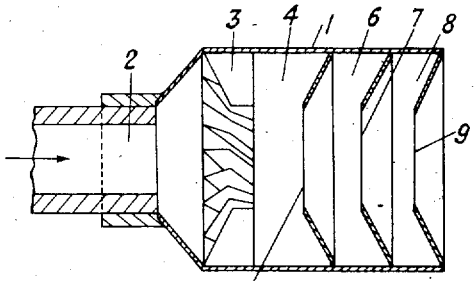
Fig. 3 is an axial section of a silencer for muffling the noise of discharge from a gun.

As shown in Figs. 1 and 2 the inner ends of the vanes 3 are attached to a central piece 12 of conoidal shape. In the form shown in Fig. 3 this central piece is omitted to allow the passage of the bullet or projectile from a firearm or gun.

When the silencer is to be used for muffling intake noises of internal combustion engines and in compressors, the discharge end of the silencer is connected to the intake of the engine or the like, and atmospheric air is admitted at the inlet end of the silencer.

In the silencers illustrated a strong converging vortex is generated in each vortex chamber and in its central discharge aperture, so that, particularly in these central discharge apertures, there is a large velocity of whirl. The fluctuating or non-uniform flow of gas entering the silencer from the engine or gun causes fluctuations in the whirling motion of the gas in the vortex chambers, but these fluctuations are very much less in the rapidly whirling gas than they would be in an initially non-whirling or stationary gas. In effect, the whirling gas passing through the central discharge aperture functions as a gaseous fly-wheel, so that the higher its speed the smaller need be the fluctuations of its speed in order to absorb the energy of the gases entering the silencer. Now, the noise of non-uniformly discharging gases is proportional to the departure from uniformity of the rate of energy discharge, and, as the flywheel action promotes uniformity of discharge, the noise of discharge is greatly eliminated.

What I claim is:—

1. A silencer comprising a hollow shell in the form of a body of revolution having a gas entrance at one end and a gas discharge opening substantially at the axis at the opposite end, an internal substantially imperforate transverse deflector mounted adjacent to said gas entrance, a circular series of fixed internal vanes arranged around and inclined to the axis of revolution across the annular gap between said deflector and the walls of said shell, said deflector and vanes impressing a whirling motion on the entering gas, and a series of transverse baffles situated between said deflector and vanes and said discharge opening, each baffle throughout at least substantially the major portion of its periphery contacting the inner surface of said shell, each baffle presenting a surface of revolution having a linear generatrix, and being formed centrally with a substantially circular aperture through which the gas flows with a spiral vortical motion, said baffles being otherwise substantially imperforate, and compartments formed on each side of each baffle, each of said compartments being bounded at one end by a baffle and free of internal obstructions and extending the full diameter of said shell whereby the spiral vortical motion impressed upon the gas by said deflectors and vanes at the entrance end of said shell is continued by the apertures in the baffles to thereby promote a uniform discharge of the gas from said silencer.

2. A silencer comprising a hollow shell in the form of a body of revolution having a gas entrance at one end and a gas discharge opening substantially at the axis of the opposite end, an internal imperforate transverse deflector mounted adjacent to said gas entrance, a circular series of fixed internal vanes arranged around and inclined to the axis of revolution across the annular gap between said deflector and the walls of said shell, said deflector and vanes impressing a definite whirling motion on the entering gas, and at least one frusto-conical baffle situated between said deflector and vanes and said discharge opening, the larger end of said baffle throughout its periphery contacting the inner surface of said shell, the smaller end of said baffle being directed toward the inlet and forming a substantially circular aperture through which the gas flows with a spiral vortical motion, said baffle being otherwise imperforate, and compartments formed on each side of said baffle, each of said compartments being bounded at one end by said baffle and free of internal obstructions and extending the full diameter of said shell whereby the spiral vortical motion impressed upon the gas by said deflectors and vanes at the entrance end of said shell is continued by said aperture to thereby promote a uniform discharge of the gas from said silencer.

WILLIAM ALEXANDER.